Dec. 6, 1955 M. M. SEELOFF 2,726,371
ANTIFRICTION CURRENT TRANSFER MEANS FOR ROTARY APPARATUS
Filed Dec. 13, 1951
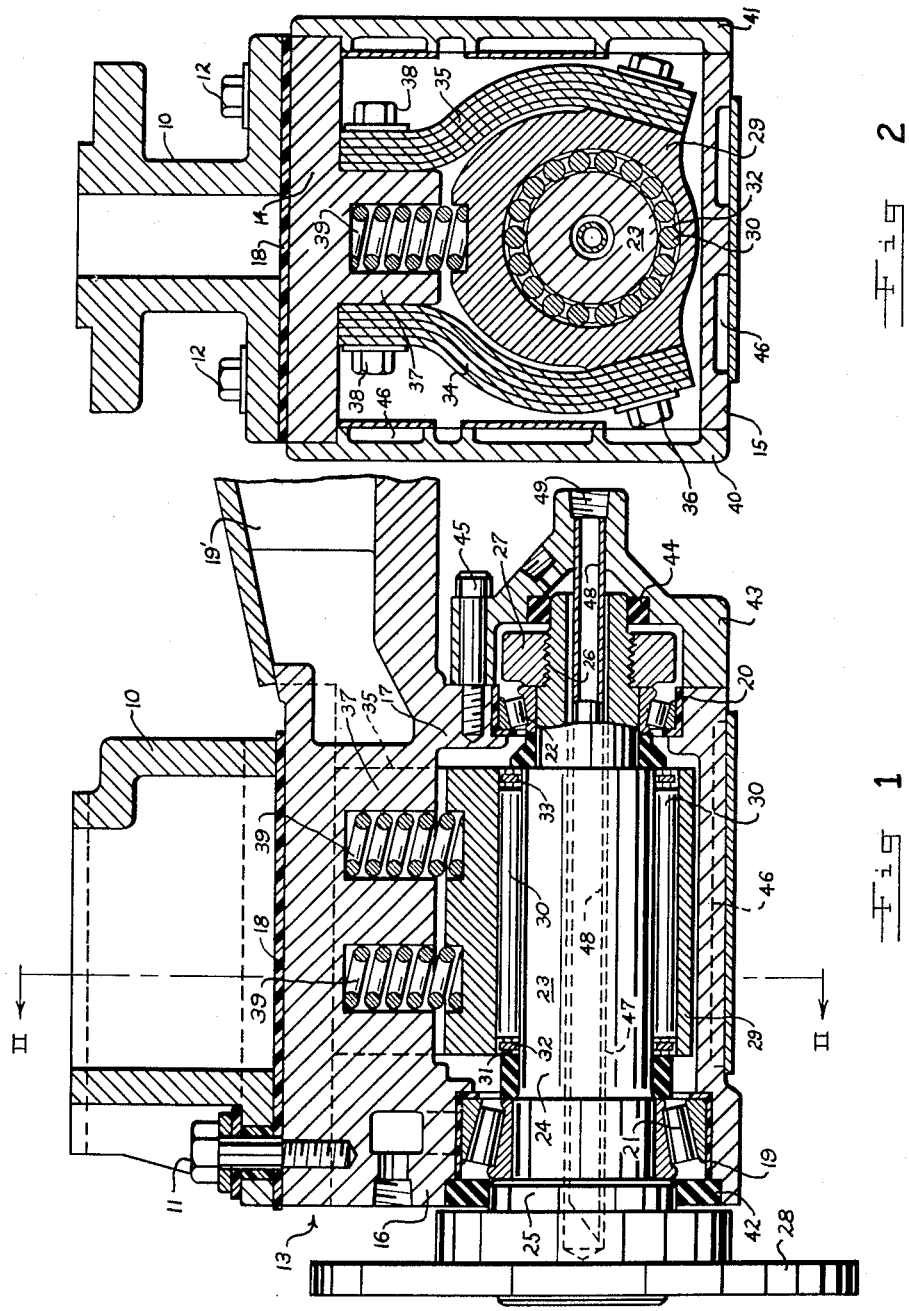
INVENTOR
MELVIN M. SEELOFF
BY Francis J. Klempay
ATTORNEY

United States Patent Office 2,726,371
Patented Dec. 6, 1955

2,726,371

ANTIFRICTION CURRENT TRANSFER MEANS FOR ROTARY APPARATUS

Melvin M. Seeloff, Warren, Ohio, assignor to The Taylor-Winfield Corporation, Warren, Ohio, a corporation of Ohio Application December 13, 1951, Serial No. 261,520

5 Claims. (Cl. 339—5)

The present invention relates to rotary apparatus for use in electric resistance welding, continuous strip electroplating and the like, and more particularly to improvements in apparatus of this type whereby large electrical currents may be transferred between relatively movable contact parts in the absence of sliding fractional contact therebetween.

It is an object of the present invention to provide rotary electrical apparatus, for use in electric resistance welding apparatus, for example, wherein anti-frictional means are utilized for rotatably supporting a movable member and for efficient low resistance transfer of electrical current between said movable member and a non-movable supporting member therefor.

Another object of this invention is the provision of apparatus having the above named characteristics wherein the anti-frictional means for rotatably supporting the movable part is structurally and electrically independent from the anti-frictional current transfer means whereby the first of said means functions exclusively as supporting means, and the second of said means functions exclusively as current transfer contact means. This arrangement has been found to be particularly desirable in, for example, electric resistance seam welding apparatus, wherein it may be desirable to exert varying mechanical pressures upon the work pieces without appreciably altering the electrical characteristics of the electrode apparatus.

Yet another object of the present invention is the provision of a rotary assembly having anti-friction current transfer means wherein the said current transfer means is continuously immersed in a bath of lubricant, as for example castor oil, to thus further reduce friction between relatively movable parts, improve electrical contact between the parts and increase the cooling capacity of the apparatus.

Specifically, the invention seeks to provide rotary electrical apparatus of inexpensive and utilitarian construction wherein a plurality of current conductive anti-friction members are interposed between the rotating and non-rotating conductor members of the apparatus to conduct electric currents therebetween in a practical and efficient manner while imposing a minimum frictional burden upon the apparatus. The teachings of this invention are intended to provide practical and durable rotary electrical apparatus capable of extensive periods of maintenance-free use under severe operating conditions as will appear.

In accord with the above it is a further object of the invention to provide rotary apparatus for use particularly where unusually high electric currents are to be conducted, as for example in electric resistance welding apparatus, wherein there is minimum interference with the welding throat clearance of an assembled machine so that a favorable balance may be struck between electrical and work-positioning characteristics of the apparatus.

The above and other objects and advantages of the invention will become apparent upon full consideration of the following detailed specification and accompanying drawing wherein is described a certain preferred embodiment of the invention.

In the drawing:

Figure 1 is an axial section view of rotary electrode apparatus constructed in accordance with the teachings of my invention; and Figure 2 is a section view of my apparatus taken generally along line II—II of Figure 1.

In Figure 1 of the drawing the reference numeral 10 designates a rigid mounting member for my rotary electrode apparatus which is adapted to be associated with suitable power actuating means, not shown, for effecting vertical movement of the electrode apparatus into and out of welding position as may be required during the normal use thereof. Secured to the mounting member 10, by means of a plurality of bolts 11 and 12, is a rigid current conductive body member 13 having top, bottom and left and right end walls 14, 15, 16 and 17 respectively. In the preferred construction of the apparatus the body member 13 is electrically isolated from the mounting member 10 therefor and for this purpose I have provided a relatively non-resilient insulating member 18 of suitable plastic material, for example, which is interposed between the members 10 and 13. Extending outwardly from the left end wall 17 of the body member 13, as an integral part thereof, is a current conductive arm 19' which is adapted to communicate with one terminal of a source of electrical energy, not shown, as for example a welding transformer, whereby current may be supplied to the body member 13.

Mounted in the end walls 16 and 17, and preferably electrically isolated therefrom by means of insulating members 19 and 20, are spaced axially aligned anti-friction roller bearings 21 and 22. In accordance with the general objects of the invention bearings 21 and 22 are of the thrust resisting tapered roller type as shown in Figure 1.

Journaled in the body member 13 by means of bearings 21 and 22 is current conductive electrode spindle 23 having an even-diametered contact portion 24 extending substantially between the bearings 21 and 22 as shown. The spindle 23 is provided near its left hand end with an enlarged shoulder 25 adapted to abut bearing 21, and near its right hand end with a threaded portion 26 adapted to receive a retaining nut 27. By suitable adjustment of the retaining nut 27 the spindle 23 may be rigidly restrained by the bearings 21 and 22 against longitudinal movement with respect to the body member 13.

Secured to the spindle 13 by any suitable means, not shown, whereby adequate electric contact may be effected is an electrode wheel 28 which, in accordance with the usual practice in the art, is adapted to be rolled relative to workpieces, not shown, during a seam welding or similar operation.

In accordance with the objects of the invention electric current is transferred from the current conductive body member 13 to the spindle 23 and thence to the electrode wheel 28 as the latter rotates across the surface of the workpieces, not shown. For this purpose I have provided a current collector shoe 29 having a bore therethrough of greater diameter than that of the contact portion 24 of spindle 23. In the embodiment shown the current collector shoe 29 is substantially as long as the contact portion 24 and in the assembled apparatus the shoe 29 is positioned concentrically about the spindle 23 along the axial extent of the contact portion 24 thereof.

Interposed between the collector shoe 29 and the spindle 23 are a plurality of circumferentially spaced elongated anti-friction rollers 30 of current conducting material, as for example copper. The rollers 30 each have roll neck portions 31 at each end thereof which are rotatably received in cage rings 32 and 33 whereby the rollers 30 are permanently retained in spaced relation. The construction, as will be observed, is substantially similar to that of a conventional anti-friction roller bearing.

In normal operation of my apparatus an uninterrupted current path must be provided between the electrode wheel 28 and the arm 19. To accomplish this in the light of the teachings of the invention I have provided a pair of flexible current conductive members 34 and 35, preferably of laminated construction, which are secured at one end to the collector shoe 29 by means of a plurality of bolts 36, and in a like manner are secured at the other end to a depending ridge portion 37 of the housing 13 by means of bolts 38. Thus it will be apparent that substantially regardless of movement of the spindle 23 with respect to the housing 13 as may be caused, for example, by looseness in bearings 21 and/or 22 and/or by high working pressures exerted against the electrode wheel 28, the current collector shoe 29 is adapted to float freely with the shaft whereby contact pressures between the rollers 30 and the adjacent shoe 29 and contact surface 24 remain substantially unchanged.

In the illustrated embodiment of the invention current conductive members 34 and 35 are connected one on each side of the shoe 29, as shown in Figure 2, whereby rotation of the shoe with respect to the body member 13 is effectively resisted. It will be apparent, however, that means exclusive of members 34 and 35 may be provided to resist or prevent such rotation.

In order to maintain a predetermined contact pressure upon the rollers 30 I have provided a plurality of compressible coil springs 39 which are recessed in the ridge portion 37 of the housing 13 and in the current collector shoe 29; the arrangement being such that with the parts assembled as shown the springs 39 will exert a predetermined downward force upon the shoe 29 whereby a substantially predetermined contact pressure is maintained upon the rollers 30. If desirable, suitable means, not shown, may be provided in the ridge portion 37 and/or collector shoe 29 for adjusting the force exerted by springs 39. Such provision will, of course, be within the skill of a person familiar with the art.

As will be readily understood, the provision of a plurality of springs 39 bearing downwardly upon the upper portion of the collector shoe 29 will cause greater contact pressures to be exerted upon the uppermost rollers than upon the lowermost. The result is, of course, a greater current flow through the upper rollers and upper portion of the shoe 29 than through the lower. In the illustrated embodiment of the invention I have taken advantage of this fact by forming the collector shoe 29 of substantially greater cross section at the upper portion than at the lower portion. Thus the lower wall 15 of the housing 13 may be located as close as practicable to the spindle 23 to accordingly minimize interference with the throat clearance of the assembled apparatus. This is an important consideration in apparatus of this nature wherein high currents must be conducted and inductive reactance of the assembled apparatus must be maintained as low as possible while still providing sufficient work clearance.

To provide a fluid-tight enclosure for the reception of a lubricant bath, as for example castor oil, about the relatively movable parts I have provided side walls 40 and 41 which are adapted to be secured to the housing 13 in a substantially fluid-tight manner by bolts or other suitable means, not shown. In the right hand end wall 16 of the housing 13 I have provided an annular sealing member 42 of resilient material which extends from the wall 16 to the spindle. The sealing member 42 is positioned to the left of bearing 21, as shown, whereby the latter may be immersed at all times in the lubricant bath.

An end cap 43 having an annular sealing member 44 positioned therein is secured to the right hand end wall 17 by means of bolts 45. The sealing member 44 provides a fluid-tight seal at the right hand end of the spindle 23, and the member 44 is of course located outwardly of the bearing 22 whereby the same may be maintained in the bath of lubricant as desired.

Cooling of the apparatus is accomplished in the conventional manner by the provision of a plurality of passages 46 in the housing 13 and side walls 40 and 41 for the circulation of a suitable cooling medium, as for example water. For cooling the spindle 23 a longitudinal bore 47 is provided therein for the reception in spaced concentric relation of an elongated tube 48. The tube 48 is secured in the end cap 43 in communication with a suitably threaded opening 49 therein whereby the tube 48 may be connected to a source of cooling medium, not shown. If desired, passages, not shown, may be provided throughout the electrode wheel whereby cooling medium passing through the tube 48 and bore 47 may also be circulated through the wheel 28.

It should now be apparent that I have accomplished the objects initially set forth. The present invention overcomes one of the principal causes of premature failure in apparatus of this nature—frictional wear between the relatively movable contact surfaces. The advantageous use of current conductive anti-friction rollers for transferring current between movable and non-movable members of the apparatus so materially reduces frictional wear therebetween that replacement of the contact parts on that account is rarely necessary. The invention provides an effective solution to, rather than a mere remedy for the problem of frictional wear.

Combined with the anti-frictional current transfer characteristics of my apparatus I have provided an arrangement whereby additional anti-friction means function solely to rotatably support the electrode wheel and current conductive spindle therefor. Thus in the illustrated embodiment of the invention tapered roller bearings mounted in a rigid housing provide the sole means of mechanical support for the spindle 23 while the current collector shoe 29 and associated anti-friction rollers 30 provide independent contact means for transferring current from the stationary housing 13 to the rotating spindle 23. By means of springs 39 and flexible conductor members 34 and 35 the current collector shoe 29 is movable independently of the housing 13 whereby a substantially constant predetermined contact pressure may be maintained regardless of the force exerted by the housing 13 upon the spindle 23. This arrangement is particularly advantageous in electric resistance welding where welding pressures of substantial magnitude must often be exerted upon the workpieces. It will also be apparent that contact pressures will be substantially unaffected by looseness in the bearings 21 and 22 which may result from prolonged use thereof.

By providing spring means 39 acting downwardly upon the collector shoe 29 contact pressures upon various of the plurality of rollers 30 is caused to vary from a minimum at the lower side of the spindle 23 to a maximum at the upper side thereof. This arrangement results in a higher current flow through the upper portion of the shoe 29 and accordingly the lower portion may be of small cross section. Thus, although the rollers 30 are confined about the entire periphery of the spindle 23, there is a minimum of interference at the lower side of the spindle 23 and throat dimensions of the assembled apparatus may be maintained at practicable proportions.

In the preferred form of the invention, wherein the anti-frictional contact means is located intermediate bearings 21 and 22, all moving parts may be readily enclosed in a fluid-tight manner to facilitate the provision of a lubricant bath about the contact surfaces and about the supporting bearings 21 and 22. Longer operating life of the apparatus and substantially reduced maintenance costs are a natural result of this provision.

Along with the various functional advantages of my apparatus it will be apparent that the same may be easily and inexpensively constructed and may be readily assembled or disassembled for maintenance and repair or for periodical inspection of the contact parts.

It should be understood, however, that the embodiment of the invention herein illustrated and specifically described is intended to be illustrative only, and reference should therefore be had to the appended claims in determining the true scope of the invention.

I claim:

1. In apparatus for rotatably supporting and conducting welding current to a rotary resistance welding electrode and of the type having a rigid current conductive body member, means for mounting said body member, a pair of spaced aligned anti-friction bearings mounted in said body member in electrically isolated relation thereto, a current conductive spindle journaled in said bearings and extending outwardly of one end of said body member, an electrode wheel secured to the outwardly extending portion of said spindle, and means for transferring current from said body member to said spindle; the improvement in said means for transferring current comprising an even diametered portion on said spindle extending substantially between said bearings, a plurality of current conductive anti-friction rollers positioned about said contact portion in contact therewith, cage means to maintain said rollers in circumferentially spaced relation, a current collector shoe positioned about said contact portion in contact with said plurality of rollers, flexible conductor means connecting said shoe and said current conductive body member, and spring means acting on said shoe and said body member adapted to urge said shoe toward said contact portion, said spring means acting on one side only of said shoe, said shoe being of substantially greater cross section at said one side than at the side opposite said one side.

2. In apparatus for rotatably supporting and conducting electric current to a rotary current conductive member and of the type having a rigid current conductive body member, a pair of spaced aligned bearings mounted in said body member, a current conductive spindle journaled in said bearings and extending outwardly of one end of said body member, said rotary current conductive member being secured to the outwardly extending end of said spindle, and means to transfer current from said body member to said spindle; the improvement in said means to transfer comprising a contact portion on said spindle, a plurality of current conductive anti-friction rollers positioned adjacent said contact portion in contact therewith, a current collector shoe positioned adjacent said contact portion in contact with said rollers, means to urge said shoe toward said rollers and said contact portion, flexible conductor means connecting said body member and said shoe, and means to resist rotation of said shoe with respect to said body member, said current collector shoe comprising a ring-like member positioned about said contact portion and said rollers, said means to urge said shoe toward said rollers and said contact portion acting upon one side only of said shoe, said shoe being of substantially greater cross section at said one side than at the side opposite said one side.

3. In a rotary current transfer device for carrying heavy welding load currents and of the type having a body member, spaced anti-friction bearings, a current conductive spindle mounted in said bearings, and means to transfer current from said body member to said spindle; the improvement in said means to transfer comprising an even diametered contact portion on said spindle, a plurality of elongated current conductive anti-friction rollers positioned about said contact portion in electrical contact therewith, a current collector shoe positioned about said contact portion in contact with said plurality of rollers, spring means acting on one side of said shoe and on said body member to urge said shoe toward said contact portion, and means to prevent rotation of said shoe comprising laminated flexible conductor means connecting said shoe and said body member.

4. Apparatus according to claim 3 further characterized by said conductor means comprising laminated flexible conductors connecting said body member adjacent said spring means and connecting said shoe on the side thereof opposite said one side, one of said conductors being positioned on each side of said spring means.

5. In a rotary current transfer device for carrying heavy welding load currents and of the type having a body member, spaced anti-friction bearings, a current conductive spindle mounted in said bearings, and means to transfer current from said body member to said spindle; the improvement in said means to transfer comprising an elongated linear contact portion on said spindle, a plurality of elongated current conductive anti-friction rollers positioned about said contact portion in electrical contact therewith, a current collector shoe positioned about said contact portion in contact with said plurality of rollers, spring means acting on one side of said shoe and on said body member to urge said shoe toward said contact portion, and means to prevent rotation of said shoe comprising laminated flexible conductor means connecting said shoe and said body member.

References Cited in the file of this patent

UNITED STATES PATENTS

| | | |
|---|---|---|
| 1,350,572 | Smith | Aug. 24, 1920 |
| 2,086,784 | Taylor | July 13, 1937 |
| 2,268,031 | Guthrie | Dec. 30, 1941 |
| 2,293,852 | Root | Aug. 25, 1942 |
| 2,414,957 | Larrabure | Jan. 28, 1947 |
| 2,529,634 | Sciaky | Nov. 14, 1950 |